Aug. 24, 1943.  R. D. McINTOSH  2,327,654
FITTING GUARD FOR VALVES
Filed Oct. 13, 1941
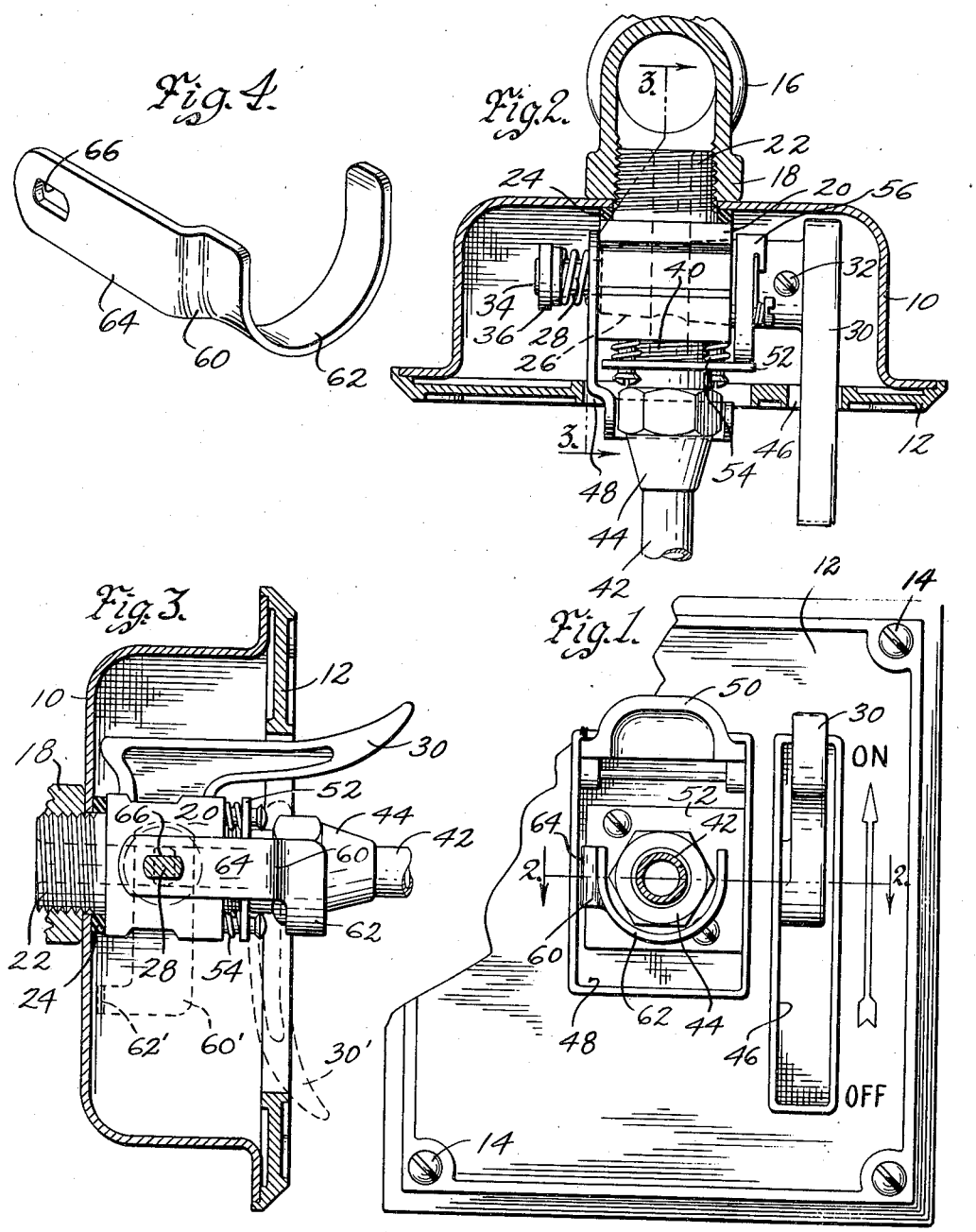
Inventor
Robert D. McIntosh
by Bair & Freeman
Attorneys Patented Aug. 24, 1943

2,327,654

UNITED STATES PATENT OFFICE 2,327,654

FITTING GUARD FOR VALVES

Robert D. McIntosh, River Forest, Ill., assignor to The Imperial Brass Manufacturing Company, Chicago, Ill., a corporation of Illinois Application October 13, 1941, Serial No. 414,830

3 Claims. (Cl. 284—4)

My invention relates to valves and particularly to a guard for the valve which may extend around a nut fastened to an inlet or outlet to the valve to prevent application of a wrench to the nut when the valve is turned on and which is removable from its position around the nut in order to permit ready application of a wrench to the nut for removal of an inlet or outlet connection when the valve is in a closed position.

Among the objects of my invention is to provide an additional safety feature for a gas valve installed in an outlet box in the wall so that there may be no inadvertent removal of the outlet connection from the valve whenever the valve chances to be open.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is an elevational view of the outside of a gas valve outlet box showing the guard in the position occupied when the valve is turned on;

Figure 2 is a cross sectional view taken on the line 2—2 of Figure 1 with the valve in the position shown in Figure 1;

Figure 3 is a vertical, sectional view through the box taken on the line 3—3 of Figure 2 showing in solid lines the position of the guard in open position for the valve and in dotted lines the position of the guard in closed position for the valve; and Figure 4 is a perspective view of the element comprising the guard.

In providing valves for outlet boxes which are ordinarily placed in the wall of a room on the baseboard, it is necessary that the valves be constructed to include a very positive safety feature. Valves in this position may be easily tampered with by children and need be constructed so that the safety features are as near foolproof as possible. Not only must the valve be so constructed that it cannot be opened unless a connection is made to the outlet on the body, as shown, for example, in my copending application Serial No. 365,318, now Patent No. 2,236,104 granted March 25, 1941, but also the valve must include structure which will prevent removal of the pipeline from an outlet therefor while the valve remains in open position.

In the embodiment chosen to illustrate my invention, there is shown a valve outlet box 10 designed to be inserted in the wall of a room provided with a cover plate 12 adapted to be attached to the box by means of screws 14. A gas pipeline 16 is positioned at the rear of the box with an elbow fitting 18 shown facing the rear wall of the box. A valve body 20 has a threaded inlet connection 22 passing through an aperture in the rear wall of the box and threaded tightly into the elbow. A gasket 24 insures a leakproof joint so that should any gas escape at the connection, it will be prevented from passing into the interior of the box. The valve body is provided with a valve element 26 here shown as a plug valve which has on it a stem 28 extending toward the left, as viewed in Figure 2, and likewise extending toward the right where a handle 30 is attached thereto by means of a screw 32. A lock nut 34 of the conventional type is used for holding a coiled spring 36 in position so that the valve may be forced constantly to a tightly seated position.

On the side of the valve body opposite the threaded inlet connection there is provided a threaded outlet connection 40 adapted to receive and have attached thereto an outlet pipe 42. As hereshown, the outlet pipe has a conventional flared end and a nut 44 of the flared type for securing the outlet pipe to the outlet connection.

The front plate 12 has a vertically elongated aperture 46 through which the valve handle 30 extends outwardly and an aperture 48 opposite the outlet connection through which the outlet connection extends. A lid 50 is shown in Figure 1 which is designed to be pivotally moved to a position covering the outlet connection on the valve whenever the outlet pipe 42 is removed.

On the valve body is shown a plate 52 partly held in position by springs 54 and adapted to control a latch 56 as described in detail in my co-pending application Serial No. 365,318.

A guard generally designated by the numeral 60 is provided with a rounded semi-circular collar 62 shown in Figures 1, 2 and 3 in a position surrounding the hexagonal portion of the nut 44. It will be noted that the opening on the topside of the collar is slightly in excess of the maximum diameter of the hexagonal portion of the nut so that the collar may be slipped easily into place around that hexagonal portion. On one side of the collar there is an extension 64 provided at its opposite end with an elongated aperture 66. It is necessary only that the aperture 66 be non-circular in shape. The valve stem 28, as shown best in Figure 3, has a shape permitting the extension having the recess 66 to be slid over the end of the valve stem in order that the guard may be non-rotatably attached to the stem. The extension 64 extends radially outward relative to the axis of the valve stem in a direction toward the outlet connection on the valve body.

In operation, when the valve is turned off and the handle 30 is moved downward to the dotted position 30' shown in Figure 3, the guard 60 and collar 62 are moved to 60' and 62' downwardly into the outlet box. In this position, there in ready access to the threaded outlet connection 40. This permits a mechanic to easily apply a tube 42 to the outlet connection and secure it thereto by means, for example, of a flared nut 44. When the connection has been completed, the valve can be opened by moving the handle 30 to the full line position shown in Figure 3, for example. Movement of the handle to the full line position likewise moves the guard to the full line position shown in Figure 3 wherein the collar 62 passes to a position surrounding the hexagonal portion of the nut. This is open position for the valve. When the valve is thus in open position, the collar 62 so effectively surrounds the hexagonal portion of the nut that a person who might inadvertently wish to remove the outlet connection could not apply the wrench to the hexagonal portion in order to loosen the nut from the outlet connection. It is only when the handle 30 is pressed downwardly to a shut-off position for the valve that the guard is removed, permitting access to the nut.

There has thus been provided a safety feature for a gas valve installed in an outlet box which prevents rotating the nut connecting the outlet piping to the valve except when the valve has been properly and safely closed.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A valve safety outlet device comprising a box, a cover plate for the box, a valve in said box having a stem extending laterally therefrom, an outlet connection facing the cover plate and a handle on the stem having an elongated portion extending through the cover plate and substantially flush with the outer surface thereof in closed position and adapted to be lifted outwardly therefrom to open position, said cover plate having an aperture for the outlet connection, and a guard having one end non-rotatably connected to the stem and having a collar at the other end encompassing a space slightly greater in area than the outlet connection, said guard having an initial position inside the box remote from the outlet connection when the valve is closed and a position wherein the collar is projected from the box through the aperture and surrounds the outlet connection when the valve is open.

2. A valve safety outlet device comprising a box adapted to be set in a wall, a cover plate for the box, a valve in said box having a stem extending laterally therefrom and an outlet connection facing the cover plate, said cover plate having an elongated aperture at one side and a central aperture surrounding the valve outlet port, a handle on the stem having an elongated portion lying in said elongated aperture substantially flush with the cover plate in closed position and adapted to be lifted outwardly therefrom to open position and a guard comprising an arm having one end non-rotatably secured to the stem at the end opposite from the handle and having a collar at the other end encompassing a space slightly greater in area than the cross sectional area of said outlet connection, said guard having an initial position inside the box remote from the outlet connection when the valve is closed and a position wherein the collar is projected from the central aperture of the box and surrounds the outlet connection when the valve is open.

3. A valve safety outlet device comprising a box adapted to be set in a wall, a cover plate for the box adapted to be set substantially flush with the wall surface, a valve in said box having a stem extending parallel to the cover plate and an outlet port facing the cover plate having a flat sided nut threaded thereon, said cover plate having an elongated aperture at one side and a central aperture surrounding the valve outlet port, a handle on the stem having an elongated portion lying in said elongated aperture substantially flush with the cover plate in closed position and adapted to be lifted outwardly therefrom to open position and a guard comprising an arm having one end non-rotatably secured to the stem at the end opposite from the handle and having a collar at the other end encompassing a space slightly greater in area than the cross section of said nut adjacent the flat sides thereof, said guard having an initial position inside the box remote from the outlet port when the valve is closed and an operative position wherein the collar is projected from the box at the central aperture and surrounds the flat sides of the nut when the valve is open to prevent unscrewing and removal of the nut.

ROBERT D. McINTOSH.